(12) United States Patent
Takami

(10) Patent No.: US 8,572,116 B2
(45) Date of Patent: Oct. 29, 2013

(54) SYSTEM FOR RECOMMENDING AN ARTICLE NOT PRESENT IN AN IMAGE

(75) Inventor: Shinya Takami, Tokyo (JP)

(73) Assignee: Rakuten, Inc., Tokyo (JP)

(*) Notice: Subject to any disclaimer, the term of this patent is extended or adjusted under 35 U.S.C. 154(b) by 27 days.

(21) Appl. No.: 13/375,379

(22) PCT Filed: Sep. 9, 2010

(86) PCT No.: PCT/JP2010/065523
§ 371 (c)(1),
(2), (4) Date: Feb. 15, 2012

(87) PCT Pub. No.: WO2011/040202
PCT Pub. Date: Apr. 7, 2011

(65) Prior Publication Data
US 2012/0179716 A1    Jul. 12, 2012

(30) Foreign Application Priority Data

Sep. 30, 2009  (JP) .............................. P2009-228691
Sep. 30, 2009  (JP) .............................. P2009-228692

(51) Int. Cl.
*G06F 7/00*  (2006.01)
*G06F 17/30*  (2006.01)

(52) U.S. Cl.
USPC .......................................... 707/771; 707/772

(58) Field of Classification Search
None
See application file for complete search history.

(56) References Cited

U.S. PATENT DOCUMENTS

| 2002/0133428 A1* | 9/2002 | Mori et al. ....................... 705/26 |
| 2004/0107147 A1 | 6/2004 | Uemura et al. |
| 2008/0215427 A1 | 9/2008 | Kawada et al. |
| 2012/0166305 A1* | 6/2012 | Karnalkar et al. ........... 705/26.8 |

FOREIGN PATENT DOCUMENTS

| JP | 2002-157599 A | 5/2002 |
| JP | 2002-342790 A | 11/2002 |
| JP | 2003-30198 A | 1/2003 |
| JP | 2004-295291 A | 10/2004 |
| JP | 2006-31200 A | 2/2006 |

(Continued)

OTHER PUBLICATIONS

Oh Byung Kwon ""I know what you need to buy": context aware multimedia-based recommendation system", Expert Systems with Applications 25 (2003), 14 pages.*

(Continued)

*Primary Examiner* — Uyen Le
(74) *Attorney, Agent, or Firm* — Sughrue Mion, PLLC

(57) ABSTRACT

An object is to conduct a search for an article absent in an input image. A recommendation system according to an embodiment of the present invention is provided with an input unit to achieve input of a still image, an article recognizing unit to analyze the input image to recognize an article section according to an article included in the image, a category specifying unit to specify a category according to the input image on the basis of the recognized article section, an article information extracting unit to extract identification information of an article section except for the recognized article section among article sections associated with the specified category, and an output unit to output the extracted identification information of the article section and/or information corresponding thereto. This configuration allows the recommendation system of the embodiment to provide a function (article search function) to achieve input of a still image including one or more articles and output of identification information of an article section according to an article absent in the image and/or other information.

17 Claims, 11 Drawing Sheets

(56) References Cited

FOREIGN PATENT DOCUMENTS

| JP | 2007-102407 A | 4/2007 |
| JP | 2008-33819 A | 2/2008 |
| JP | 2008-90745 A | 4/2008 |
| JP | 2008-282098 A | 11/2008 |

OTHER PUBLICATIONS

Amazon.co.jp, http://www.amazon.co.jp/gp/help/customer/display/html?ie=UTF8&nodeId=779360.

International Search Report of PCT/JP2010/065523, dated Oct. 12, 2010.

Japanese Notice of Allowance of PCT/JP2010/065523, dated Apr. 19, 2011.

Japanese Office Action of PCT/JP2010/065523, dated Jan. 25, 2011.

Rakuten Ichiba, Rakuten, Inc., http://www.rakuten.co.jp/index.html.

Rakuten web service, Rakuten, Inc., Rakuten Item Search API, Sep. 15, 2010, http://webservice.rakuten.co.jp/index.html.

International Preliminary Report on Patentability issued in International Application No. PCT/JP2010/065523 dated May 18, 2012.

* cited by examiner

Fig.3

(a)
USER INFORMATION (USER DB)

| USER ID |
| --- |
| PASSWORD |
| ⋮ |

(b-1)
ARTICLE SECTION INFORMATION (SEARCH DB)

| ARTICLE SECTION ID (GENRE ID) |
| --- |
| NAME |
| FEATURE PATTERN 1 |
| FEATURE PATTERN 2 |
| ⋮ |

(b-2)
CATEGORY INFORMATION (SEARCH DB)

| CATEGORY ID |
| --- |
| NAME |
| DESCRIPTION |
| ⋮ |

(b-3)
ARTICLE LIST INFORMATION (SEARCH DB)

| CATEGORY ID |
| --- |
| ARTICLE SECTION ID (GENRE ID) |
| PRIORITY |
| ⋮ |

(c)
POSTING HISTORY INFORMATION (IMAGE DB)

| POSTING HISTORY ID |
| --- |
| POSTING DATE |
| USER ID |
| IMAGE FILE PATH |
| ⋮ |

(d-1)
COMMODITY INFORMATION (COMMODITY DB)

| COMMODITY CODE |
| --- |
| GENRE ID |
| IN-STOCK COUNT |
| COMMODITY PAGE URL |
| COMMODITY IMAGE URL |
| COMMODITY DESCRIPTION |
| ⋮ |

(d-2)
RANKING INFORMATION (COMMODITY DB)

| RANKING SECTION ID |
| --- |
| COMMODITY CODE 1 |
| COMMODITY CODE 2 |
| ⋮ |

Fig.8

(a)
CATEGORY INFORMATION (EXAMPLE 1)

| CATEGORY ID |
| --- |
| NAME "BATHROOM" |
| DESCRIPTION "PHOTOGRAPHIC IMAGE OF BATHROOM" |
| ⋮ |

(b)
ARTICLE LIST OF "BATHROOM" (EXAMPLE 1)

| 1 | BATHTUB |
| --- | --- |
| 2 | BATHTUB COVER |
| 3 | SHOWERHEAD |
| 4 | SHAMPOO |
| 5 | CONDITIONER |
| 6 | MIRROR |
| 7 | CURTAIN |
| 8 | SINK |
| | ⋮ |

*Fig.10*

(a)
CATEGORY INFORMATION (EXAMPLE 2)

| CATEGORY ID |
|---|
| NAME "WOMAN" |
| DESCRIPTION "PHOTOGRAPHIC IMAGE OF WOMAN" |
| ⋮ |

(b)
ARTICLE LIST OF "WOMAN" (EXAMPLE 2)

| 1 | CLOTHING |
|---|---|
| 2 | WATCH |
| 3 | PIERCED EARRINGS |
| 4 | NECKLACE |
| 5 | BAG |
| 6 | SUNGLASSES |
| 7 | BELT |
| 8 | SHOES |
| ⋮ | ⋮ |

SYSTEM FOR RECOMMENDING AN ARTICLE NOT PRESENT IN AN IMAGE

CROSS REFERENCE TO RELATED APPLICATIONS

This application is a National Stage of International Application No. PCT/JP2010/065523, filed on Sep. 9, 2010, which claims priority from Japanese Patent Application Nos. 2009-228691 and 2009-228692, both filed on Sep. 30, 2009, the contents of all of which are incorporated herein by reference in their entirety.

TECHNICAL FIELD

The present invention relates to a scheme for suggesting (or recommending) commodities online and, more particularly, to a process of searching for an article absent in an image.

BACKGROUND ART

<Prior Art 1>
A function to search for target commodities is provided in an online shopping mall (e.g., cf. Non Patent Literature 1). In the foregoing shopping mall, for example, the following search functions are provided.
   search by keyword: search by entering a name of a target commodity in a search box.
   search by genre: search for a commodity by narrowing down a commodity genre.
<Prior Art 2>
There is a known service on the Internet to provide information of personalized recommendations suitable for the favor of a user in real time (e.g., cf. Non Patent Literature 2). In the foregoing service, a list of personalized recommendations supposed to arouse interest of each user is created and updated, based on data of user's buying history, evaluation of commodities, owned commodities, and so on, with reference to data of other users as well. The personalized recommendations are displayed in various pages on a site.
<Prior Art 3>
There is a known technique to recognize a type of an article present in a photographic image (e.g., cf. Patent Literature 1, Patent Literature 2, and so on). For example, Patent Literature 1 discloses the technique to recognize an article by the following procedure.
   (1) to acquire a photographic image.
   (2) to extract feature points from the acquired photographic image (S10 in FIG. 4).
   (3) to calculate spatial positions of the extracted feature points (S12 in FIG. 4).
   (4) to perform clustering based on the calculated spatial positions to determine an article corresponding to each cluster, based on the size of the cluster generated by the clustering (FIG. 6 and others).
<Prior Art 4>
There are public APIs allowing acquisition of information of commodities in an online shopping mall (e.g., cf. Non Patent Literature 3). By making use of the APIs, it also becomes possible to perform a narrowing search by a genre and availability for sale (whether in-stock or out-of-stock), as well as the commodity search by keyword. There is also a public API allowing acquisition of ranking information in the same mall (e.g., cf. Non Patent Literature 3). By making use of this API, it is feasible to acquire information of hot-selling commodities in each of commodity genres, in each of genders and ages of users, and so on.

CITATION LIST

Patent Literatures

Patent Literature 1: Japanese Patent Application Laid-open No. 2008-033819
Patent Literature 2: Japanese Patent Application Laid-open No. 2002-157599

Non Patent Literatures

Non Patent Literature 1: Rakuten Inc., "Rakuten Ichiba," [online], Internet <URL: http://www.rakuten.co.jp/index.html>
Non Patent Literature 2: Amazon Japan Inc., "personalized recommendations," [online], Internet <URL: http://www.amazon.co.jp/gp/help/custo mer/display.html?ie=UTF8&nodeId=779360>
Non Patent Literature 3: Rakuten Inc., "Rakuten Web Service," [online], Internet <URL: http://webservice.rakuten.co.jp/index.html>

SUMMARY OF INVENTION

Technical Problem

The aforementioned search functions of <Prior Art 1> are assumed to be used by users who have decided target commodities to some extent. In the aforementioned service of <Prior Art 2>, commodities to be suggested for users are selected based on the data such as the user's buying history and others. A problem to be solved by the present invention is to perform a search for an article absent in an input image, for application to selection of commodities to be suggested (or recommended) for users.

Solution to Problem

A recommendation system according to the present invention is a recommendation system connectable with a user's terminal, having: article list storing means storing, corresponding to identification information of each category, an article list including multiple pieces of identification information of article sections associated with the aforementioned category, the recommendation system comprising: input means which receives an image containing at least one article, from the terminal, thereby to achieve input of the image; article recognizing means which analyzes the input image to recognize an article section according to the article contained in the image; category specifying means which refers to the article list storing means to specify a category corresponding to the input image on the basis of the recognized article section; article information extracting means which extracts from the article list storing means, identification information of an article section except for the recognized article section among article sections associated with the specified category; and output means which outputs information corresponding to the extracted identification information of the article section.

The recommendation system of the present invention may be configured as follows: it further comprises: commodity information storing means storing identification information of a commodity section and a URL of a commodity image, corresponding to identification information of each commodity; and commodity information searching means which searches the commodity information storing means, using the extracted identification information of the article section, to extract a URL of a commodity image according to a commodity corresponding to the article section; the output means creates a search result page in which a link to the commodity image is arranged, using the extracted URL of the commodity image, and sends the search result page to the terminal.

The recommendation system of the present invention may be configured as follows: it further comprises: commodity information storing means storing a URL of a commodity image, corresponding to identification information of each commodity; and commodity information searching means which searches the commodity information storing means, using the extracted identification information of the article section, to extract a commodity image according to a commodity corresponding to the article section; the output means creates a search result page in which the extracted commodity image is arranged, and sends the search result page to the terminal.

The recommendation system of the present invention may be configured as follows: the category specifying means selects at least one category candidate on the basis of the recognized article section, sends to the terminal, identification information of the category candidate and/or information corresponding thereto, receives category designation information from the terminal, and specifies the category corresponding to the input image on the basis of the designation information.

The recommendation system of the present invention may be configured as follows: the commodity information searching means searches for only a commodity in stock.

The recommendation system of the present invention may be configured as follows: the commodity information searching means acquires, using the extracted identification information of the article section, ranking information of a commodity section corresponding to the article section, and searches for a commodity at a high rank among commodities according to the commodity section.

The recommendation system of the present invention may be configured as follows: the article list storing means further stores priorities for the respective article sections; the article information extracting means preferentially extracts identification information of an article section with a high priority.

The recommendation system of the present invention may be configured as follows: the input means receives a search request mail to designate the image, from the user's terminal, thereby to achieve input of the designated image; the recommendation system further comprises: search condition setting means which sets, using the extracted identification information of the article section, a search condition for searching for a commodity according to a commodity section corresponding to the article section; and commodity information acquiring means which creates a search URL to which the set search condition is added, and acquires a URL of a commodity page according to a commodity satisfying the search condition by designating the search URL; the output means creates a search result mail describing the acquired URL of the commodity page, and sends the search result mail to a sender mail address of the received search request mail.

The recommendation system of the present invention may be configured as follows: the commodity information acquiring means further acquires a URL of a commodity image according to the commodity satisfying the set search condition; the output means creates, using the acquired URL of the commodity image and the URL of the commodity page, a search result page in which a reference to the commodity image and a link to the commodity page are arranged, and creates a search result mail describing a URL of the search result page instead of the URL of the commodity page.

The recommendation system of the present invention may be configured as follows: the search condition setting means sets a search condition for searching for only a commodity in stock.

The recommendation system of the present invention may be configured as follows: the search condition setting means acquires, using the extracted identification information of the article section, ranking information of the commodity section corresponding to the article section, and sets a search condition for searching for a commodity at a high rank among commodities according to the commodity section.

The recommendation system of the present invention may be configured as follows: the input means receives a search request mail to designate the image, from the user's terminal, thereby to achieve input of the designated image; the output means creates, using the extracted identification information of the article section, a search result mail describing a URL of a ranking information appearing page according to a commodity section corresponding to the article section, and sends the search result mail to the terminal.

The recommendation system of the present invention may be configured as follows: the input means receives a search request mail containing a keyword associated with the image; the category specifying means specifies the category corresponding to the input image, further using the keyword.

The recommendation system of the present invention may be configured as follows: the input means receives a search request to designate the image, from the user's terminal, thereby to achieve input of the designated image; the recommendation system further comprises: search condition setting means which sets, using the extracted identification information of the article section, a search condition for searching for a commodity according to a commodity section corresponding to the article section; and commodity information acquiring means which creates a search URL to which the set search condition is added, and acquires a URL of a commodity image according to a commodity satisfying the search condition by designating the search URL; the output means creates a search result page in which a reference to the commodity image is arranged, using the acquired URL of the commodity page, and sends the search result page to the terminal.

A recommendation method according to the present invention is a recommendation method to be carried out by a recommendation system connectable with a user's terminal, having article list storing means storing, corresponding to identification information of each category, an article list including multiple pieces of identification information of article sections associated with the aforementioned category, the recommendation system executing: an input step of receiving an image containing at least one article, from the terminal, thereby to achieve input of the image; an article recognizing step of analyzing the input image to recognize an article section according to the article contained in the image; a category specifying step of referring to the article list storing means to specify a category corresponding to the input image on the basis of the recognized article section; an article information extracting step of extracting from the article list storing means, identification information of an article section except for the recognized article section among article sections associated with the specified category; and an output step of outputting information corresponding to the extracted identification information of the article section.

A recommendation program according to the present invention is a recommendation program to be carried out by a recommendation system connectable with a user's terminal, having article list storing means storing, corresponding to identification information of each category, an article list including multiple pieces of identification information of article sections associated with the aforementioned category, the recommendation program letting the recommendation system execute: an input step of receiving an image containing at least one article, from the terminal, thereby to achieve input of the image; an article recognizing step of analyzing the input image to recognize an article section according to the article contained in the image; a category specifying step of referring to the article list storing means to specify a category corresponding to the input image on the basis of the recognized article section; an article information extracting step of extracting from the article list storing means, identification information of an article section except for the recognized article section among article sections associated with the specified category; and an output step of outputting information corresponding to the extracted identification information of the article section.

A computer-readable recording medium according to the present invention is a recording medium recording a program to be carried out by a recommendation system connectable with a user's terminal, having article list storing means storing, corresponding to identification information of each category, an article list including multiple pieces of identification information of article sections associated with the aforementioned category, the program letting the recommendation system execute: an input step of receiving an image containing at least one article, from the terminal, thereby to achieve input of the image; an article recognizing step of analyzing the input image to recognize an article section according to the article contained in the image; a category specifying step of referring to the article list storing means to specify a category corresponding to the input image on the basis of the recognized article section; an article information extracting step of extracting from the article list storing means, identification information of an article section except for the recognized article section among article sections associated with the specified category; and an output step of outputting information corresponding to the extracted identification information of the article section.

Advantageous Effects of Invention

The recommendation system of the present invention allows a search for an article absent in an input image. A commodity recommendation system constructed with the recommendation system of the present invention and the user's terminal in connection is able to suggest (or recommend) commodities associated with an article absent in an input image, for users.

BRIEF DESCRIPTION OF DRAWINGS

FIG. 3 is an explanatory diagram of data items in databases. (Embodiment)

FIG. 8 is an explanatory diagram of partial data in a search DB. (Example 1)

FIG. 10 is an explanatory diagram of partial data in a search DB. (Example 2)

DESCRIPTION OF EMBODIMENTS

Definitions category: section for sorting a still image posted.
article section: section of corporeal objects. In the description hereinafter, it refers to a section of corporeal objects corresponding to a genre of commodities provided in an EC (Electronic Commerce) management service.

Embodiments

1. General Outline

Figure 1:
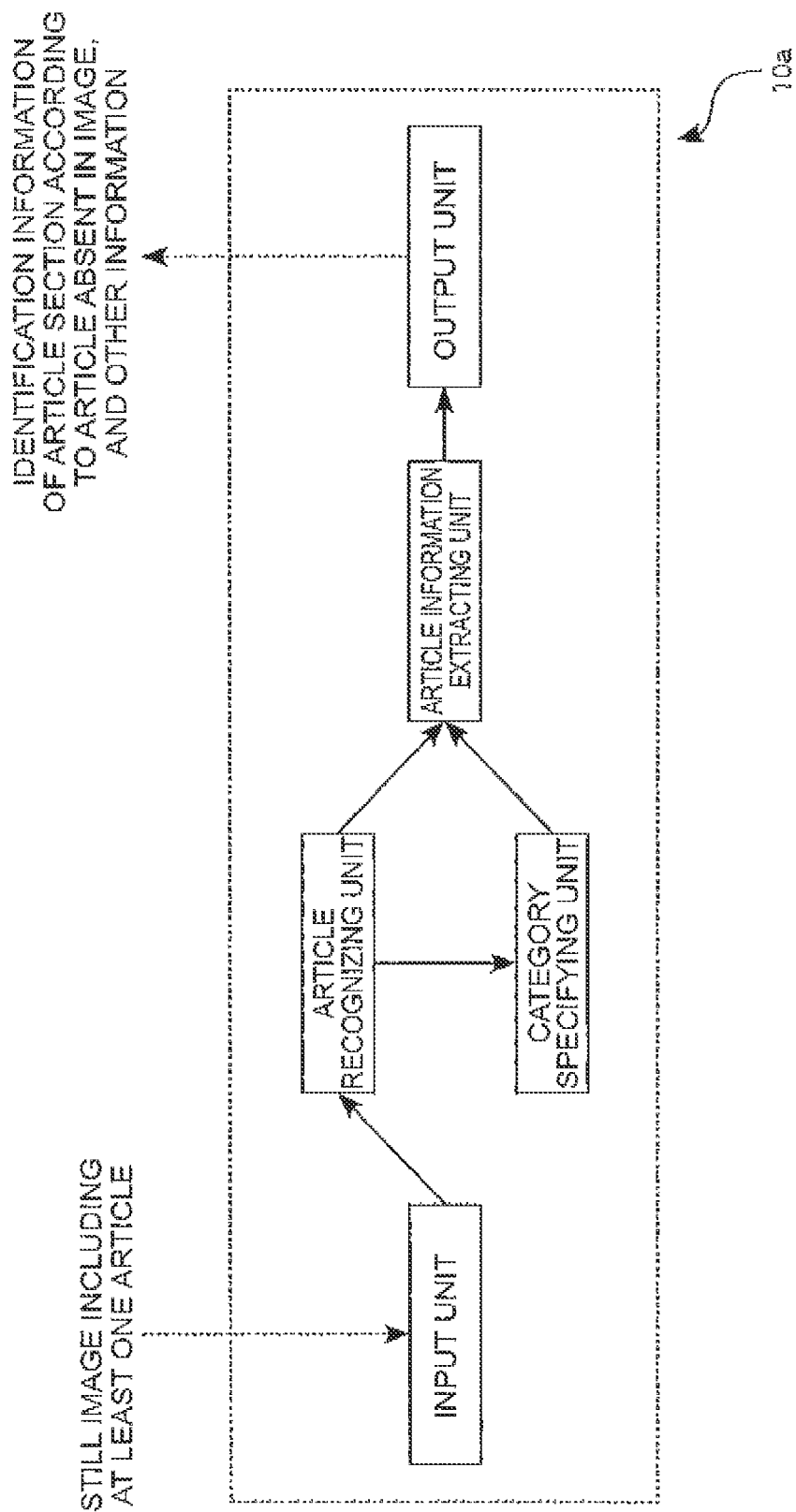
FIG. 1 is a function block diagram of a recommendation system. (Embodiment)

FIG. 1 shows a functional configuration of a recommendation system. As shown in FIG. 1, the recommendation system of the present embodiment is provided with an input unit to achieve input of a still image, an article recognizing unit to analyze the input image to recognize an article section according to an article included in the image, a category specifying unit to specify a category corresponding to the input image on the basis of the recognized article section, an article information extracting unit to extract identification information of an article section except for the recognized article section among article sections associated with the specified category, and an output unit to output the extracted identification information of the article section and/or information corresponding thereto. This configuration allows the recommendation system of the present embodiment to provide a function (article search function) to achieve input of a still image including one or more articles and output of identification information of an article section according to an article absent in the image and/or other information.

2. System Configuration

Figure 2:
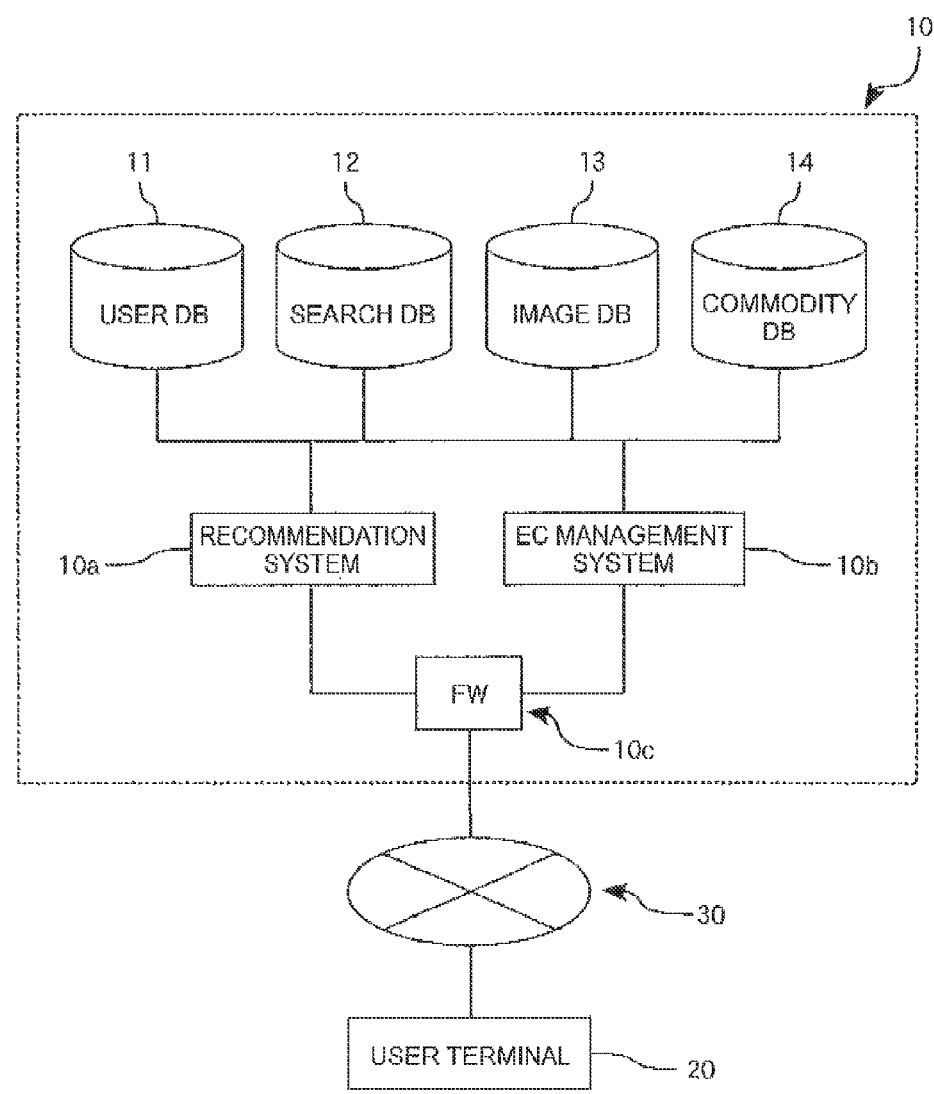
FIG. 2 is a block diagram showing a system configuration. (Embodiment)

FIG. 2 shows a configuration of a system of the present embodiment. As shown in FIG. 2, the system of the present embodiment, as a whole, is composed of a recommendation system 10a, an EC management system 10b, and a user terminal 20. The recommendation system 10a and the EC management system 10b share user DB 11, search DB 12, image DB 13, and commodity DB 14, thereby constituting a commodity recommendation system 10. Each of the recommendation system 10a and the EC management system 10b is connected through a transit switching unit (firewall 10c in the present embodiment) and a communication network (Internet 30 in the present embodiment) to the user terminal 20.

[2-1. Recommendation System]

In FIG. 2, the recommendation system 10a is a server group to provide the article search function. The recommendation system 10a includes, for example, a Web server having Web-page creating and sending functions, a mail server having e-mail creating and sending functions, a search server to execute a data search process, a DB server to manage the databases, an image analyzing server to execute an image analysis process, and other necessary application servers.

[2-2. EC Management System]

In FIG. 2, the EC management system 10b is a server group to provide the EC (Electronic Commerce) management service. The EC management system 10b includes, for example, a Web server having Web-page creating and sending functions, a mail server having e-mail creating and sending functions, a search server having a data search function, a DB server to manage the databases, and other necessary application servers. The EC management system 10b is the same as a conventional system to manage the online shopping mall service of the prior art example (e.g., cf. <Prior Art 1>).

[2-3. User DB]

In FIG. 2, the user DB 11 is a database storing information of users who use the EC management service and the commodity recommendation service. FIG. 3 (a) shows principal items of the user information. As shown in FIG. 3 (a), one piece of user information contains a "user ID" and a "password."

[2-4. Search DB]

In FIG. 2, the search DB 12 is a database storing information used by the recommendation system 10a on the occasion of providing the article search function. In the present embodiment, the database stores multiple pieces of each of article section information, category information, and article list information and these are arranged to correspond to each other through key items.

FIG. 3 (b-1) shows principal items of the article section information. As shown in FIG. 3 (b-1), one piece of article section information contains an "article section ID," a "name" of an article section, and "feature patterns" of articles (1, 2, . . . ) The "article section ID" herein is information to identify a section (type) of articles and the present embodiment employs a "genre ID" for one-to-one correspondence to classification of commodities. The "feature patterns" are data used in a pattern matching process for recognition of an article in an image.

As long as it is possible to specify at least one corresponding commodity section (genre) when a section (type) of an article is specified, the classification system of articles and the classification system of commodities (genres) may be in multiple-to-one, one-to-multiple, or multiple-to-multiple correspondence. For example, by preparing a table showing the correspondence relationship between "article section IDs" and "genre IDs" of commodities, when a section (type) of an article is specified, it is feasible to specify at least one corresponding commodity section (genre).

FIG. 3 (b-2) shows principal items of the category information. As shown in FIG. 3 (b-2), one piece of category information contains a "category ID," a "name" of a category, and a "description" of the category. The "name" of the category may be used as the identification information of the category.

FIG. 3 (b-3) shows principal items of the article list information. As shown in FIG. 3 (b-3), one piece of article list information contains a "category ID," "article section IDs," and "priorities." An assemblage of article list information with a common "category ID" corresponds to an article list according to the "category ID." The "priorities" herein are numerical values indicative of degrees of association with the category; for example, the larger the numerical value, the higher the priority. In the present embodiment, it is assumed that the database stores numerical values artificially set by an administrator of the recommendation system 10a.

It is also possible to use as the "priorities" occurrence frequencies (occurrence counts) of respective articles automatically tallied up in each category. For example, the system may be configured as follows: every time an article section according to an article present in a posted image is recognized to specify a category of the image, an occurrence count of the recognized article section in the category is updated. As long as a recognition rate of an article section in the image analysis process is sufficiently high, the magnitude of the occurrence count becomes approximately coincident with the level of the occurrence frequency of the article section.

[2-5. Image DB]

In FIG. 2, the image DB 13 is a database storing image posting histories and posted image files. FIG. 3 (c) shows principal items of the posting history information. As shown in FIG. 3 (c), one piece of posting history information contains a "posting history ID," a "posting date," a "user ID," and an "image file path." The image DB 13 is assumed to store a posted image in a predetermined file format.

[2-6. Commodity DB]

In FIG. 2, the commodity DB 14 is a database storing information associated with commodities to be targets of transactions (orders) in the EC management service. In the present embodiment, the database stores multiple pieces of each of commodity information and ranking information and these are arranged to correspond to each other through key items.

FIG. 3 (d-1) shows principal items of the commodity information. As shown in FIG. 3 (d-1), one piece of commodity information contains a "commodity code," a "genre ID," an "in-stock quantity," a "commodity page URL," a "commodity image URL," and a "commodity description." The "in-stock quantity" herein is a numerical value indicative of the number of the commodity of interest available for sale and is updated on an as-needed basis on occasions of replenishment, order, cancellation, and the like of the commodity. Commodity image files are assumed to be stored in a predetermined file format in the commodity DB 14 or in another commodity image DB (not shown).

FIG. 3 (d-2) shows principal items of the ranking information. As shown in FIG. 3 (d-2), one piece of ranking information contains a "ranking section ID" and "commodity codes" (1, 2, . . . ) The ranking information is assumed to be updated on an as-needed basis, based on the results of periodical tallies at every given period. In the present embodiment, the database is assumed to store at least the ranking information for each "genre ID."

[2-7. User Terminal]

In FIG. 2, the user terminal 20 is a terminal used by a user who uses the commodity recommendation service and the EC management service. The user terminal 20 has a Web browser and can display a Web page (data of the HTML format or the like) received from the recommendation system 10a or the EC management system 10b, on its display. Furthermore, the user terminal 20 has a mailer and can display an e-mail message received from the recommendation system 10a or the EC management system 10b, on the display. The user terminal 20 may be an existing information processing terminal with a communication function (e.g., an electronic computer such as a personal computer, a cell phone unit, or the like).

3. Suggestion of Commodities

[(a) Suggestion Procedure of Commodities]

Figure 4:
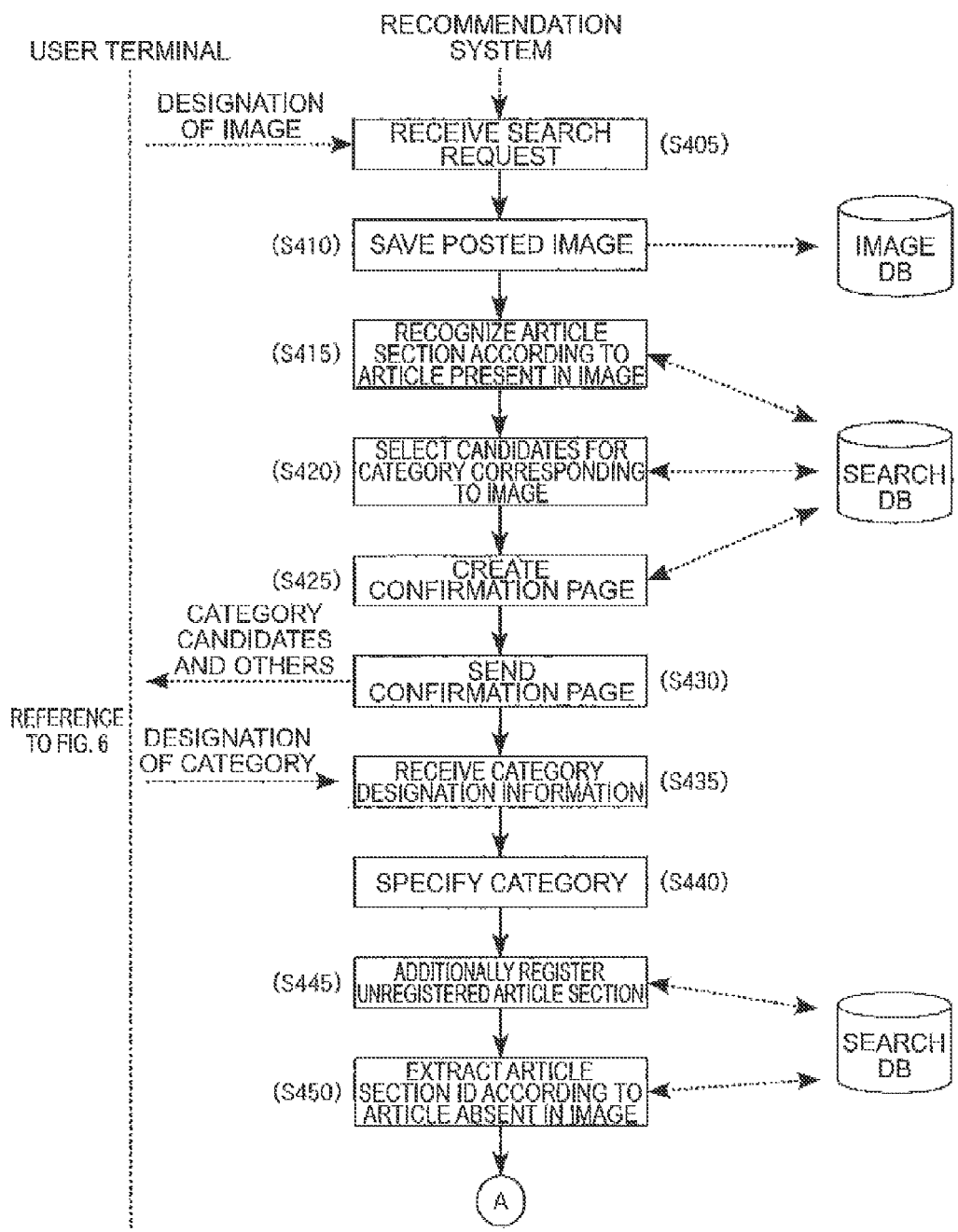
FIG. 4 is a flowchart showing a commodity suggestion procedure. (Embodiment)
Figure 5:
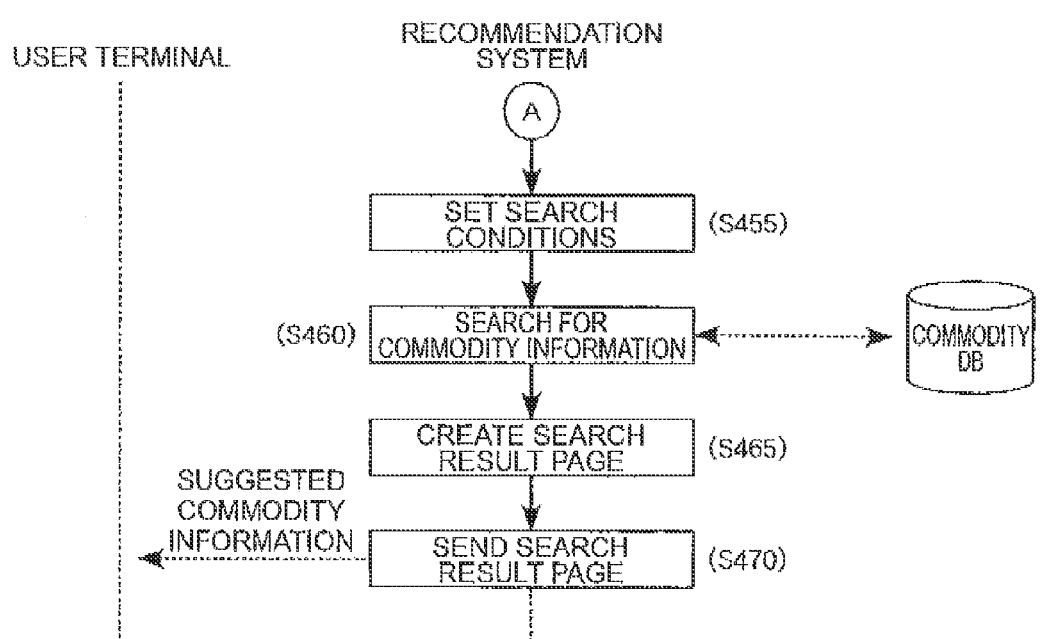
FIG. 5 is a flowchart showing the commodity suggestion procedure. (Embodiment)

FIGS. 4 and 5 show a suggestion procedure of commodities. As shown in FIGS. 4 and 5, the recommendation system 10a suggests (or recommends) commodities in accordance with the procedure of [11] to [19] below. The below will describe the procedure to be executed after the user manipulates the user terminal 20 to log into the commodity recommendation service by a user ID and a password and display a search request page (not shown). The search request page is arranged to include, for example, an image input field for a still image to be entered by drag & drop, and a send button for data of the input still image or its URL to be sent (or posted) to the recommendation system 10*a*.

[11] When the recommendation system receives a search request to designate the image, through the search request page (not shown) from the user terminal 20 (S405), it saves the designated still image (posted image) in the predetermined file format in the image DB 13 (S410) and registers the posting history information.

[12] The recommendation system analyzes the posted image to recognize an article section according to each article present in the image by pattern matching (S415). The recognition of the article section is carried out by making use of the article section information of the search DB 12.

[13] The recommendation system selects one or more category candidates corresponding to the posted image (S420). The selection of category candidates is carried out by making use of the article lists of the search DB 12.

[14] The recommendation system creates a confirmation page (FIG. 6) (S425) and sends it to the user terminal 20 (S430).

[15] The recommendation system receives category designation information through the confirmation page (FIG. 6) from the user terminal 20 (S435) and specifies a category on the basis of the designation information (S440).

[16] The recommendation system specifies an unregistered article section which is not registered yet in the article list of the specified category among the article sections recognized by pattern matching (article sections according to the article(s) present in the image), and additionally registers the unregistered article section in the article list (S445).

[17] The recommendation system specifies an article section except for the recognized article section (or an article section according to an article absent in the image) from the article list of the specified category and extracts identification information (article section ID) of the article section (S450).

[18] The recommendation system sets search conditions for searching for commodities associated with the extracted article section ID (S455) and searches the commodity DB 14 for commodities satisfying the search conditions (S460).

[19] The recommendation system creates a search result page through the use of the information of commodities acquired by the search (S465) and sends it to the user terminal 20 (S470).

[(b) Recognition of Article Present in Image]

In the above step [12], the recommendation system 10*a* analyzes the posted image to recognize an article section according to each article present in the image by pattern matching (S415). The pattern matching process can be carried out by an appropriate combination of techniques and others in the conventional examples (e.g., <Prior Art 3> and others). For example, an article section corresponding to an object can be suitably recognized in such a manner that the image is analyzed to establish an outline of at least one object, feature quantities are calculated from a plurality of viewpoints such as the shape of the outline and colors in the outline, and they are subjected to matching with each of feature patterns stored in the article section information of the search DB 12, to recognize an article section corresponding to the object.

[(c) Selection of Category Candidates]

In the above step [13], the recommendation system 10*a* selects one or more category candidates corresponding to the posted image (S420). Specifically, it selects categories including at least one section among article sections recognized in the step [12], with reference to the article lists of the search DB 12, further selects a predetermined number of categories in a descending order of association degrees (or in a decreasing order of counts of recognized article sections included in the lists), and defines these selected categories as category candidates.

When it is determined that there is only one category including all the article sections recognized in the step [12], only that category may be selected as a category candidate. Alternatively, that category may be immediately specified as a category corresponding to the posted image. In this case, it is preferable to omit the steps of sending the confirmation page (FIG. 6) to the user terminal 20 and letting the user confirm the article(s) and category.

[(d) Confirmation Page]

Figure 6:
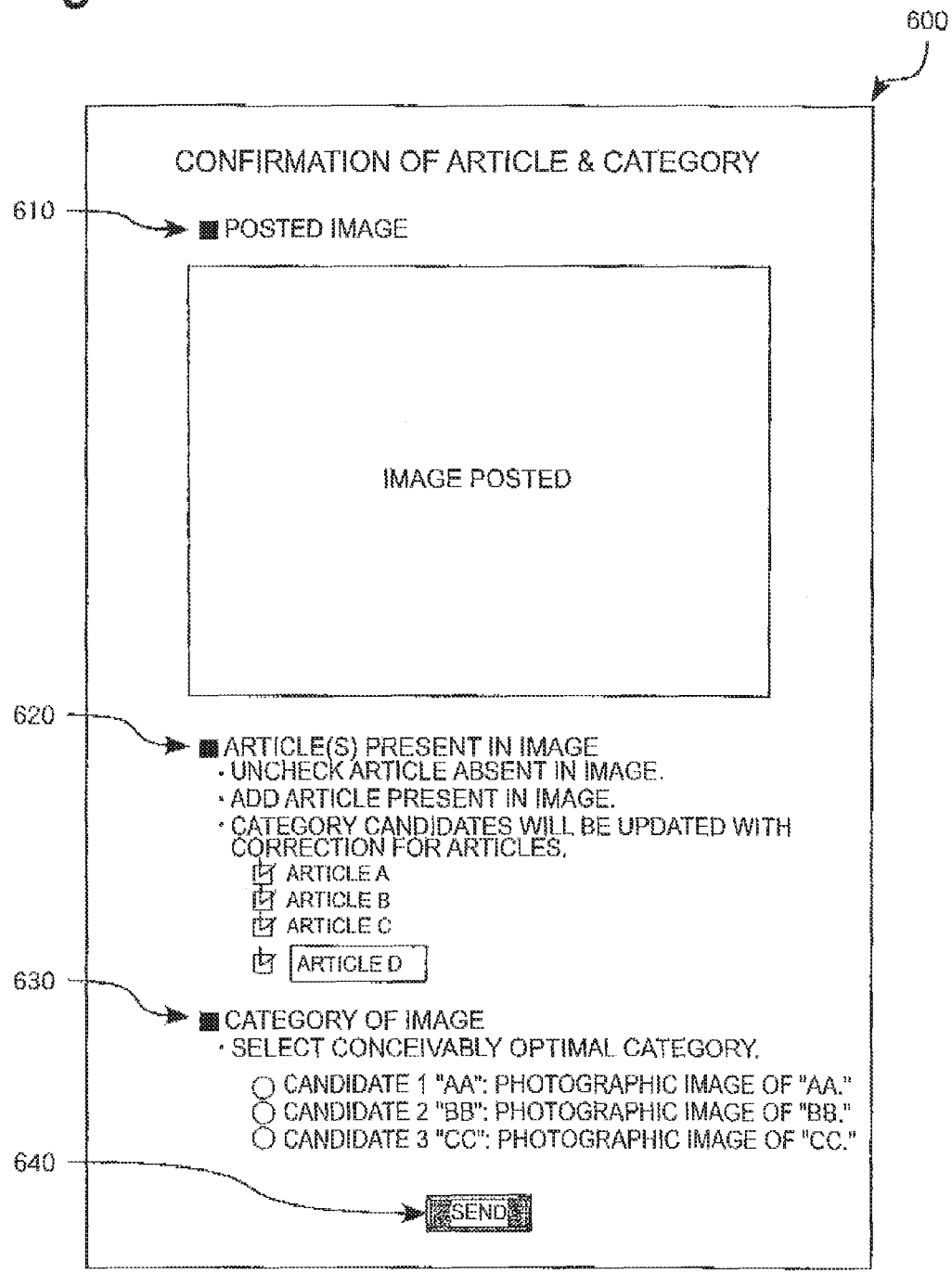
FIG. 6 is a display example of a confirmation page. (Embodiment)

FIG. 6 shows a display example of the confirmation page. As shown in FIG. 6, the confirmation page 600 contains areas 610-630 and a button 640. The posted image is displayed in the area 610. The area 620 indicates a list of names of respective article sections recognized in the above step [12]. The names of the article sections are extracted from the article section information of the search DB 12.

The area 630 indicates a list of names and descriptions of respective category candidates selected in the above step [13], and allows the user to select any one of them. The names and descriptions of the categories are extracted from the article lists of the search DB 12. When the user designates (or selects) a category in the area 630 and clicks on the button 640, the user terminal 20 sends the category designation information to the recommendation system 10*a*.

The user is allowed to correct the articles present in the image, in the area 620. For example, the user can exclude an article which has been recognized in spite of absence thereof in the image or can add an article which has not been recognized in spite of presence thereof in the image. When the user performs the article correction operation in the area 620, asynchronous communication (Ajax) is executed between the user terminal 20 and the recommendation system 10*a*, whereupon the category candidates in the area 630 are updated at once.

[(e) Additional Registration of Unregistered Article Section]

In the above step [16], the recommendation system 10*a* additionally registers the unregistered article section in the article list of the search DB 12 (S445). When the unregistered article section is added to the article list of the search DB 12 to evolve the article list, we can expect an effect of improvement in accuracy of the category specifying process. Furthermore, we can expect an effect of expanding the range of selection of suggested commodities. The system may be configured in such a manner that an article added in the confirmation page (e.g., confirmation page 600 (FIG. 6)) by the user is excluded from objects for additional registration even though it is not registered in the article list.

[(f) Extraction of Article Absent in Image]

In the above step [17], the recommendation system 10*a* extracts the identification information (article section ID) of the article section according to each article absent in the image (S450). Specifically, it specifies article sections except for the recognized article section(s) from the article list of the specified category and extracts a predetermined number of article section IDs in a descending order of priorities.

In this manner, the recommendation system 10*a* extracts the article sections except for the article section(s) recognized by the image analysis (article section(s) according to the article(s) present in the image) from the article list in which a maximum number of articles associated with the given category are registered. Therefore, the extracted article sections must be article sections associated with the foregoing category and according to the articles absent in the image. Especially, in a case where a relatively high priority is set for each article section particularly highly associated with the category, the article sections extracted herein must be data extremely significant in determining commodities to be suggested (or recommended).

[(g) Search for Suggested Commodities]

In the above step [18], the recommendation system 10$a$ sets the search conditions for searching for commodities associated with the extracted article section IDs (S455) and searches the commodity DB 14 for commodities satisfying the search conditions (S460). For example, it sets the search conditions below and extracts information of commodities satisfying the search conditions from the commodity information of the commodity DB 14. The search process is assumed to be executed through the DB server forming the recommendation system 10$a$.

(a) A recommended commodity should be classified in a genre corresponding to or associated with the article section ID extracted in the above step [17].

(b) A recommended commodity should be available for sale (or be in stock).

(c) A recommended commodity should be one whose commodity image is present.

(d) A recommended commodity should be one at a high rank (e.g., within a predetermined rank) in the genre in the above condition (a).

It is noted that the information of suggested commodities may be searched for in consideration of colors or the like of other articles recognized as present in the image. The information of suggested commodities may also be searched for in view of total coordination so as to harmonize colors, materials, designs, and so forth among the suggested commodities.

4. Modification Examples

Modification Example 1

Modification of Process Splitting

In the aforementioned embodiment, the recommendation system 10$a$ executes the processes from the reception of the search request to the transmission of the search result (cf. FIGS. 4 and 5). In contrast to it, the recommendation system 10$a$ may be configured to be specialized in the article search function (cf. FIG. 1). For example, in a case where the recommendation system 10$a$ and the EC management system 10$b$ work in cooperation with each other, the recommendation system 10$a$ receives an image from the EC management system 10$b$ and outputs the identification information of the article section according to the article absent in the image, to the EC management system 10$b$. In this case, the EC management system 10$b$ is configured to execute the process of receiving the search request from the user terminal 20, the process of conducting the search for suggested commodities, and the process of sending the search result to the user terminal 20.

Modification Example 2

Modification of Means to Acquire Information of Suggested Commodities

In the aforementioned suggestion step of commodities, the information of suggested commodities is acquired through the DB server forming the recommendation system 10$a$ (S455 to S460 in FIG. 5, the above step [18]). In contrast to it, the recommendation system 10$a$ may be configured to use a public API (e.g., cf. <Prior Art 4>) and acquire the information of suggested commodities through the EC management system 10$b$.

For example, a suitable configuration is such that the recommendation system 10$a$ generates a search URL to which search conditions (URL parameters) for searching for suggested commodities are added, and acquires information of commodities satisfying the search conditions from the EC management system 10$b$, by designating the search URL. More specifically, the information of suggested commodities is acquired in accordance with the following procedure.

(1) By using a public API for acquiring ranking information, the recommendation system 10$a$ acquires from the EC management system 10$b$, the ranking information in the genre corresponding to or associated with the article section ID extracted in the above step [17].

(2) By using a public API for acquiring commodity information, the recommendation system 10$a$ searches commodities in high ranking in the genre for information of a commodity which is available for sale (or in stock) and which has a commodity image, to acquire a URL of a commodity page of the commodity, a URL of the commodity image, and a description of the commodity.

Modification Example 3

Modification of System Configuration

Figure 7:
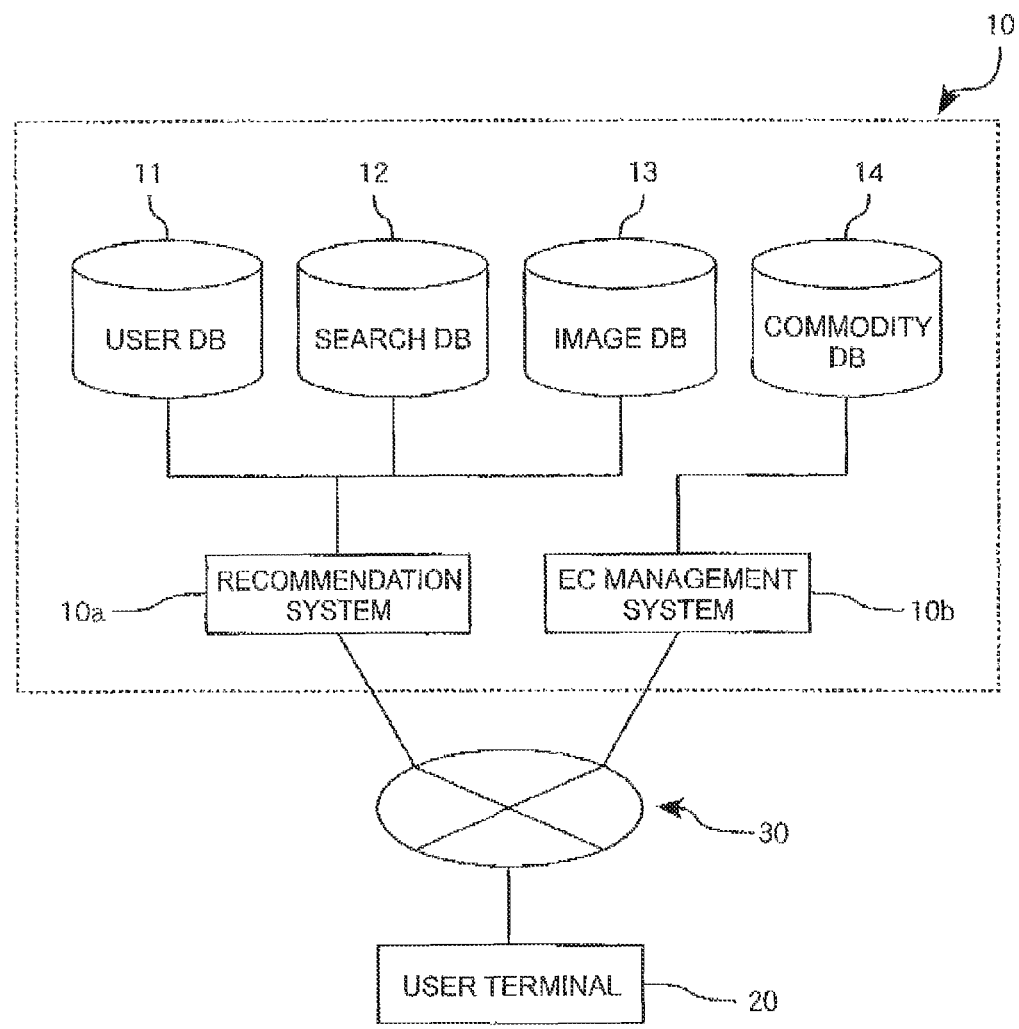
FIG. 7 is a function block diagram of a recommendation system. (Modification Example 3)

In the case where the public API is used for the commodity search, the recommendation system 10$a$ may be managed by an enterprising body different from that of the EC management system 10$b$. FIG. 7 shows a modification example of the system configuration. As shown in FIG. 7, the system of the modification example is composed of the recommendation system 10$a$, the EC management system 10$b$, and the user terminal 20. The recommendation system 10$a$ has the user DB 11, search DB 12, and image DB 13, while the EC management system 10$b$ has the commodity DB 14, thereby constituting the commodity recommendation system 10. The recommendation system 10$a$, EC management system 10$b$, and user terminal 20 are connected to each other through a communication network (Internet 30 in modification example 2).

Modification Example 4

Modification of Input/Output Mode

In the aforementioned embodiment, the recommendation system 10$a$ receives the search request (HTTP request) designating the image, from the user terminal 20, and sends the search result page (HTTP response) describing the information of suggested commodities, to the user terminal 20 (S405 in FIG. 4 and S470 in FIG. 5). In contrast to it, the recommendation system 10$a$ may also be configured to receive the search request by e-mail (search request mail) and return the search result and others by e-mail (search result mail). For example, if the user terminal 20 is a cell phone unit, a convenient mode is to use e-mail for input and output.

[(a) Search Request Mail]

The recommendation system 10$a$ is preferably configured in such a manner that with reception of an e-mail message directed to a predetermined mail address, it handles the e-mail as search request mail. The search request mail is assumed to be accompanied by an image file. A conceivable configuration is such that the user is requested to enter keywords associated with the image (e.g., a theme, a subject, a title, etc. of the image), into a message subject box of the search request mail and the keywords are used for the category specifying process (S440 in FIG. 4).

[(b) Search Result Mail]

The recommendation system 10a is preferably configured to return the search result mail to a sender mail address of the search request mail. For example, the following items are preferably described in the main body of massage in the search result mail.

- URL of a commodity page according to a commodity satisfying the search conditions (the same conditions as in the foregoing embodiment)
- URL of the search result page (the same page as in the foregoing embodiment)
- URL of a Web page containing ranking information according to the commodity genre corresponding to the extracted article section ID Example 1

The commodity recommendation service using the system of the present embodiment will be described specifically. The below will describe the contents of the category information and article lists stored in the search DB 12 and display examples of the search result page.

Example 1

Image of Bathroom

[(a) Category Information]

FIG. 8 (a) shows the contents of the category information. The category information shown in FIG. 8 (a) stores the name "bathroom" of the category and the description "photographic image of bathroom" of the category, corresponding to the "category ID."

[(b) Article List]

FIG. 8 (b) shows the contents of the article list of the "bathroom" category. As shown in FIG. 8 (b), registered in the article list of the "bathroom" category are article section IDs of "bathtub," "bathtub cover," "showerhead," "shampoo," "conditioner," "mirror," "curtain," "sink," and so forth. The numbers corresponding to the respective article sections are orders corresponding to levels of priorities.

[(c) Search Result Page]

Figure 9:
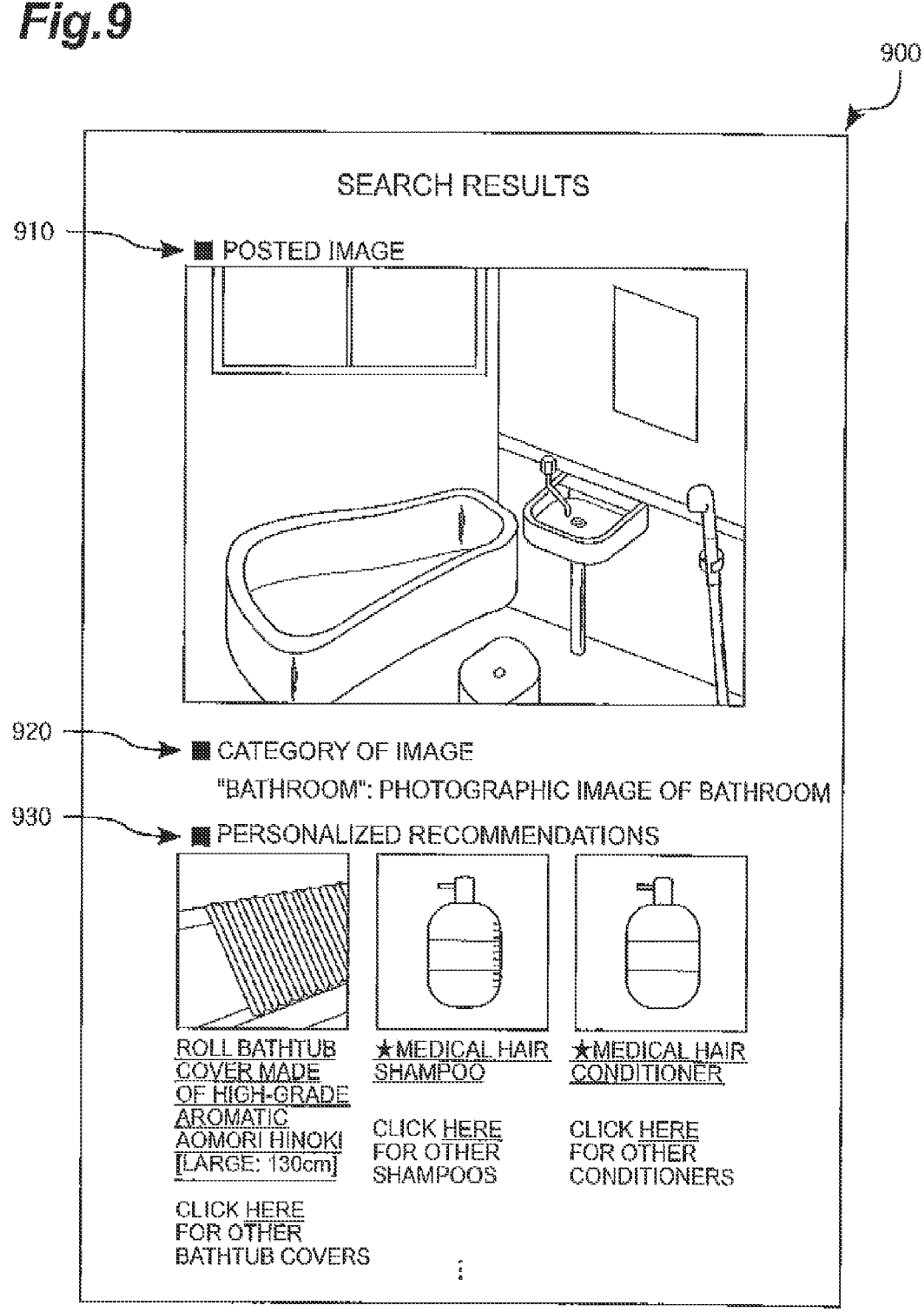
FIG. 9 is a display example of a search result page. (Example 1)

FIG. 9 shows a display example of the search result page. As shown in FIG. 9, the search result page 900 contains areas 910-930. The area 910 displays a posted image. The image in the area 910 is described as a drawing, whereas the posted image is a photographic image taken by a camera or the like. The area 920 displays a name and a description of a category specified in the above step [15]. In Example 1, the category of "bathroom" was specified based on "bathtub," "showerhead," "mirror," and "sink" recognized by the analysis process for the posted image. Therefore, the area 920 displays "bathroom: photographic image of bathroom."

The area 930 displays commodity images and commodity descriptions of suggested commodities. In Example 1, the article section IDs of "bathtub cover," "shampoo," "conditioner," etc. were extracted in the descending order of priorities among the articles except for the articles recognized as present in the image ("bathtub," "showerhead," "mirror," and "sink"), out of the article list of the "bathroom" category. Accordingly, the area 930 displays images and descriptions of commodities satisfying the below search conditions. The images and descriptions are provided as links to commodity pages.

(a) A commodity should be one corresponding to any one of the commodity sections (commodity genres) of "bathtub cover," "shampoo," "conditioner," and so on.

(b) A commodity should be one available for sale (or in stock).

(c) A commodity should be one having a commodity image.

(d) A commodity should be one at a high rank (e.g., the highest rank among the commodities satisfying the above conditions (a) to (c)) among the commodity sections (commodity genres) of "bathtub cover," "shampoo," "conditioner," and so on.

Besides, the area 930 displays links to other commodity appearing pages corresponding to the extracted article section IDs (commodity genres) (e.g., appearing pages of ranking information in the article section IDs (commodity genres), or the like). When the user manipulates the user terminal 20 to click on any one of the links, the user terminal 20 sends a transmission request of a page corresponding to the link to the EC management system 10b. The operation thereafter is carried out in accordance with the same procedure as that in the conventional online shopping mall.

Example 2

Image of Woman

[(a) Category Information]

FIG. 10 (a) shows the contents of the category information. The category information shown in FIG. 10 (a) stores the name "woman" of the category and the description "photographic image of woman" of the category, corresponding to the "category ID."

[(b) Article List]

FIG. 10 (b) shows the contents of the article list of the "woman" category. As shown in FIG. 10 (b), registered in the article list of the "woman" category are article section IDs of "clothing," "watch," "pierced earrings," "necklace," "bag," "sunglasses," "belt," "shoes," and so on. The numbers corresponding to the respective articles are orders corresponding to levels of priorities.

[(c) Search Result Page]

Figure 11:
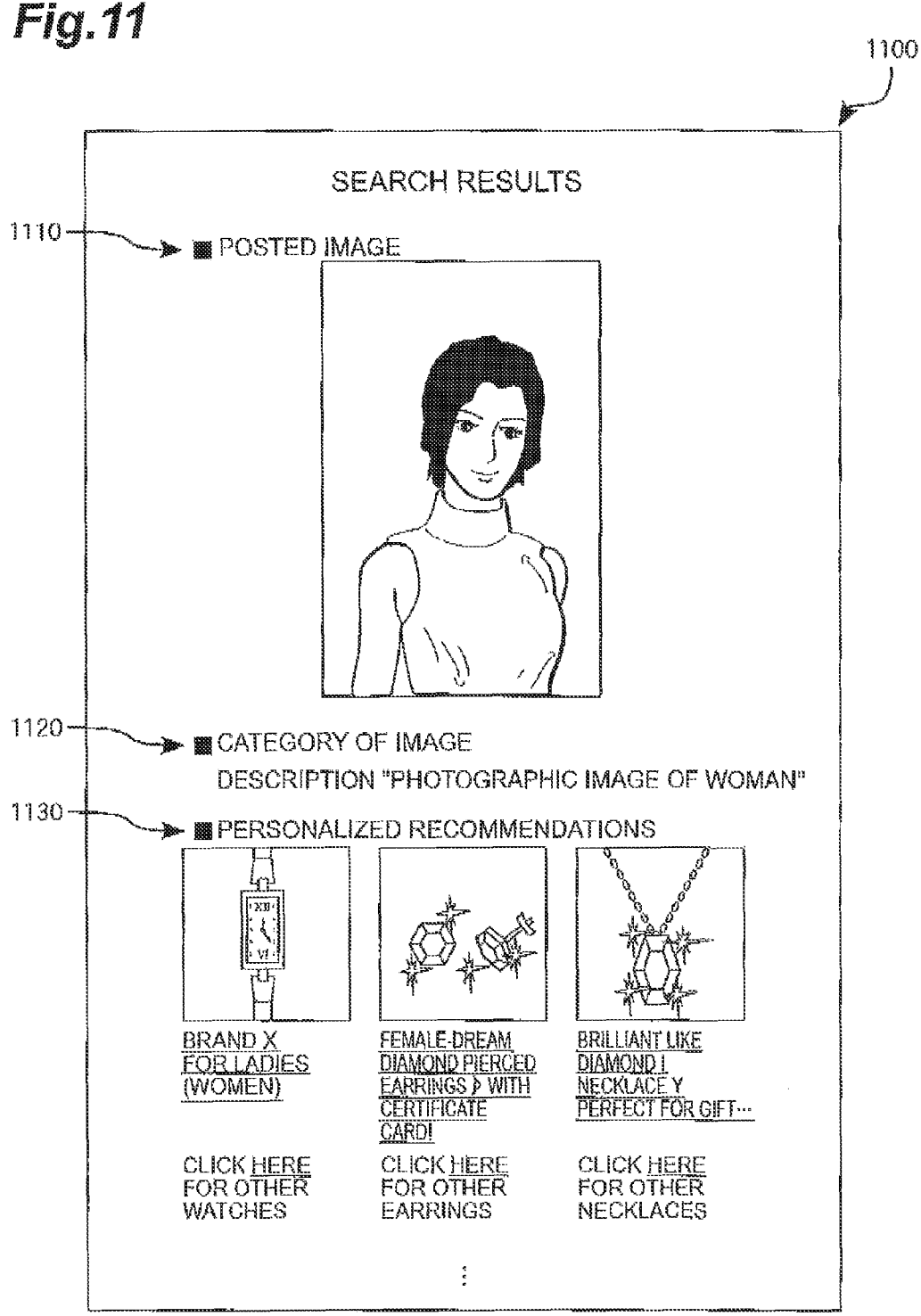
FIG. 11 is a display example of a search result page. (Example 2)

FIG. 11 shows a display example of the search result page. As shown in FIG. 11, the search result page 1100 contains areas 1110-1130. The area 1110 displays a posted image. The image in the area 1110 is described as a drawing, whereas the posted image is a photographic image taken by a camera or the like. The area 1120 displays a name and a description of a category specified in the above step [15]. In Example 2, the "woman" category was specified through the category confirmation by the user, based on "clothing" recognized by the analysis process for the posted image. Therefore, the area 1120 displays "woman: photographic image of woman."

The area 1130 displays commodity images and commodity descriptions of suggested commodities. In Example 2, the article section IDs of "watch," "pieced earrings," "necklace," etc. were extracted in the descending order of priorities among the articles except for the article recognized as present in the image ("clothing"), out of the article list of the "woman" category. Accordingly, the area 1130 displays images and descriptions of commodities satisfying the below search conditions. The images and descriptions are provided as links to commodity pages.

(a) A commodity should be one corresponding to any one of the commodity sections (commodity genres) of "watch," "pierced earrings," "necklace," and so on.

(b) A commodity should be one available for sale (or in stock).

(c) A commodity should be one having a commodity image.

(d) A commodity should be one at a high rank (e.g., the highest rank among the commodities satisfying the above conditions (a) to (c)) among the commodity sections (commodity genres) of "watch," "pierced earrings," "necklace," and so on.

Besides, the area 1130 displays links to other commodity appearing pages corresponding to the extracted article section IDs (commodity genres) (e.g., appearing pages of ranking information of the article section IDs (commodity genres), or the like). When the user manipulates the user terminal 20 to click on any one of the links, the user terminal 20 sends a transmission request of a page corresponding to the link to the EC management system 10b. The operation thereafter is carried out in accordance with the same procedure as that in the conventional online shopping mall.

REFERENCE SIGNS LIST

10 commodity recommendation system
10a recommendation system
10b EC management system
10c firewall
11 user DB
12 search DB
13 image DB
14 commodity DB
20 user terminal
30 Internet
600 confirmation page
900 search result page
1100 search result page

The invention claimed is:

1. A recommendation system connectable with a user's terminal, having:
article list storing unit storing, corresponding to identification information of each category, an article list including multiple pieces of identification information of article sections associated with said category,
the recommendation system comprising:
input unit which receives an image containing at least one article, from the terminal, thereby to achieve input of the image;
article recognizing unit which analyzes the input image to recognize an article section according to the article contained in the image;
category specifying unit which refers to the article list storing unit to specify a category corresponding to the input image on the basis of the recognized article section;
article information extracting unit which extracts from the article list storing unit, identification information of an article section except for the recognized article section among article sections associated with the specified category; and
output unit which outputs information corresponding to the extracted identification information of the article section.

2. The recommendation system according to claim 1, further comprising:
commodity information storing unit storing identification information of a commodity section and a URL of a commodity image, corresponding to identification information of each commodity; and
commodity information searching unit which searches the commodity information storing unit, using the extracted identification information of the article section, to extract a URL of a commodity image according to a commodity corresponding to the article section,
wherein the output unit creates a search result page in which a link to the commodity image is arranged, using the extracted URL of the commodity image, and sends the search result page to the terminal.

3. The commodity recommendation system according to claim 2,
wherein the category specifying unit selects at least one category candidate on the basis of the recognized article section, sends to the terminal, identification information of the category candidate and/or information corresponding thereto, receives category designation information from the terminal, and specifies the category corresponding to the input image on the basis of the designation information.

4. The recommendation system according to claim 2,
wherein the commodity information searching unit acquires, using the extracted identification information of the article section, ranking information of a commodity section corresponding to the article section, and searches for a commodity at a high rank among commodities according to the commodity section.

5. The recommendation system according to claim 2,
wherein the commodity information searching unit searches for only a commodity in stock.

6. The recommendation system according to claim 1, further comprising:
commodity information storing unit storing a URL of a commodity image, corresponding to identification information of each commodity; and
commodity information searching unit which searches the commodity information storing unit, using the extracted identification information of the article section, to extract a commodity image according to a commodity corresponding to the article section,
wherein the output unit creates a search result page in which the extracted commodity image is arranged, and sends the search result page to the terminal.

7. The recommendation system according to claim 1,
wherein the article list storing unit further stores priorities for the respective article sections, and
wherein the article information extracting unit preferentially extracts identification information of an article section with a high priority.

8. The recommendation system according to claim 1,
wherein the input unit receives a search request mail to designate the image, from the user's terminal, thereby to achieve input of the designated image,
the recommendation system further comprising:
search condition setting unit which sets, using the extracted identification information of the article section, a search condition for searching for a commodity according to a commodity section corresponding to the article section; and
commodity information acquiring unit which creates a search URL to which the set search condition is added, and acquires a URL of a commodity page according to a commodity satisfying the search condition, by designating the search URL, wherein the output unit creates a search result mail describing the acquired URL of the commodity page, and sends the search result mail to a sender mail address of the received search request mail.

9. The recommendation system according to claim 8,
wherein the commodity information acquiring unit further acquires a URL of a commodity image according to the commodity satisfying the set search condition, and
wherein the output unit creates, using the acquired URL of the commodity image and the URL of the commodity page, a search result page in which a reference to the commodity image and a link to the commodity page are arranged, and creates a search result mail describing a URL of the search result page instead of the URL of the commodity page.

10. The recommendation system according to claim 8,
wherein the search condition setting unit sets a search condition for searching for only a commodity in stock.

11. The recommendation system according to claim 8,
wherein the search condition setting unit acquires, using the extracted identification information of the article section, ranking information of the commodity section corresponding to the article section, and sets a search condition for searching for a commodity at a high rank among commodities according to the commodity section.

12. The recommendation system according to claim 8,
wherein the input unit receives a search request mail containing a keyword associated with the image, and
wherein the category specifying unit specifies the category corresponding to the input image, further using the keyword.

13. The recommendation system according to claim 1,
wherein the input unit receives a search request mail to designate the image, from the user's terminal, thereby to achieve input of the designated image, and
wherein the output unit creates, using the extracted identification information of the article section, a search result mail describing a URL of a ranking information appearing page according to a commodity section corresponding to the article section, and sends the search result mail to the terminal.

14. The recommendation system according to claim 1,
wherein the input unit receives a search request to designate the image, from the user's terminal, thereby to achieve input of the designated image,
the recommendation system further comprising:
search condition setting unit which sets, using the extracted identification information of the article section, a search condition for searching for a commodity according to a commodity section corresponding to the article section; and
commodity information acquiring unit which creates a search URL to which the set search condition is added, and acquires a URL of a commodity image according to a commodity satisfying the search condition, by designating the search URL,
wherein the output unit creates a search result page in which a reference to the commodity image is arranged, using the acquired URL of the commodity page, and sends the search result page to the terminal.

15. A recommendation method to be carried out by a recommendation system connectable with a user's terminal, having article list storing unit storing, corresponding to identification information of each category, an article list including multiple pieces of identification information of article sections associated with said category, the recommendation system executing:
an input step of receiving an image containing at least one article, from the terminal, thereby to achieve input of the image;
an article recognizing step of analyzing the input image to recognize an article section according to the article contained in the image;
a category specifying step of referring to the article list storing unit to specify a category corresponding to the input image on the basis of the recognized article section;
an article information extracting step of extracting from the article list storing unit, identification information of an article section except for the recognized article section among article sections associated with the specified category; and
an output step of outputting information corresponding to the extracted identification information of the article section.

16. A recommendation program to be carried out by a recommendation system connectable with a user's terminal, having article list storing unit storing, corresponding to identification information of each category, an article list including multiple pieces of identification information of article sections associated with said category, the recommendation program letting the recommendation system execute:
an input step of receiving an image containing at least one article, from the terminal, thereby to achieve input of the image;
an article recognizing step of analyzing the input image to recognize an article section according to the article contained in the image;
a category specifying step of referring to the article list storing unit to specify a category corresponding to the input image on the basis of the recognized article section;
an article information extracting step of extracting from the article list storing unit, identification information of an article section except for the recognized article section among article sections associated with the specified category; and
an output step of outputting information corresponding to the extracted identification information of the article section.

17. A computer-readable recording medium recording a program to be carried out by a recommendation system connectable with a user's terminal, having article list storing unit storing, corresponding to identification information of each category, an article list including multiple pieces of identification information of article sections associated with said category, the program letting the recommendation system execute:
an input step of receiving an image containing at least one article, from the terminal, thereby to achieve input of the image;
an article recognizing step of analyzing the input image to recognize an article section according to the article contained in the image;
a category specifying step of referring to the article list storing unit to specify a category corresponding to the input image on the basis of the recognized article section;

an article information extracting step of extracting from the article list storing unit, identification information of an article section except for the recognized article section among article sections associated with the specified category; and an output step of outputting information corresponding to the extracted identification information of the article section.

* * * * *